O. ELTON.
STEERING TONGUE FOR TRUCKS.
APPLICATION FILED MAR. 23, 1917.

1,248,833.

Patented Dec. 4, 1917.

Inventor:
Olof Elton

Witnesses:

UNITED STATES PATENT OFFICE.

OLAF ELTON, OF PORT WASHINGTON, WISCONSIN, ASSIGNOR TO GILSON MANUFACTURING COMPANY, OF PORT WASHINGTON, WISCONSIN.

STEERING-TONGUE FOR TRUCKS.

1,248,833.   Specification of Letters Patent.   Patented Dec. 4, 1917.

Application filed March 23, 1917. Serial No. 156,820.

*To all whom it may concern:*

Be it known that I, OLAF ELTON, a citizen of the United States, and resident of Port Washington, in the county of Ozaukee and State of Wisconsin, have invented certain new and useful Improvements in Steering-Tongues for Trucks; and I do hereby declare that the following is a full, clear, and exact description thereof.

The present invention relates to new and useful improvements in steering means for draft impelled vehicles, and is more particularly directed to that type of structure wherein the steering wheels are independently pivoted at the front of the vehicle and are both directly operable by the draft tongue to procure a steering action whereby the vehicle may turn in an arc of maximum diameter.

Various structures of this type have heretofore been employed, but are open to the objection that an excessive strain in operation is imposed on the pivots of the steering wheel axis and it is the object of the present invention to provide a structure wherein the wheels are directly controlled by the draft tongue, but wherein no strain incident to propulsion of the vehicle or to the weight of the tongue is imparted to the pivots in a manner tending to damage said pivots, as occurs in the existent types of tongue controlled steering knuckles.

It is further an object to provide a structure of the class described adapted particularly for embodiment in connection with a truck structure, and comprising a maximum simplicity of parts.

With the above and other objects and advantages in view, the invention resides more particularly in the novel combination, arrangement and formation of parts more particularly hereinafter described and particularly pointed out in the appended claim.

Figure 1:
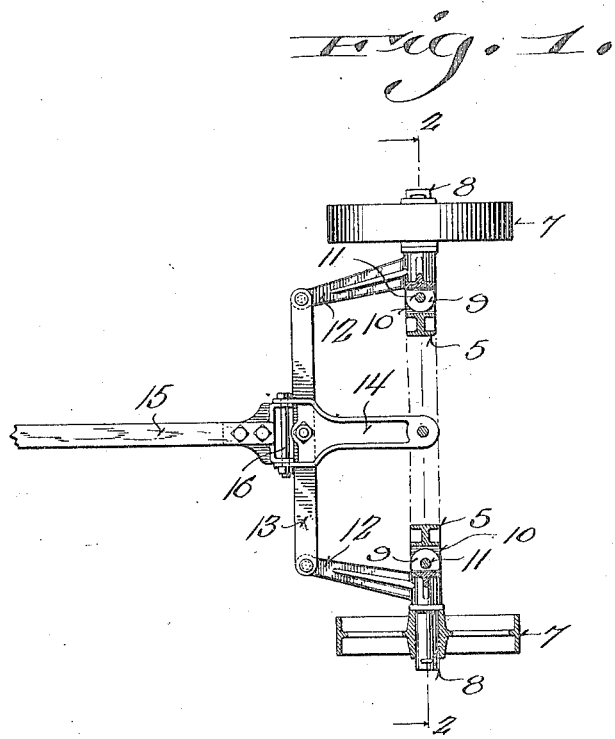
Figure 1 is a top plan view of the tongue of a steering structure comprising the present invention, this view being taken as indicated on the line 1—1 of Fig. 2.
Figure 2:
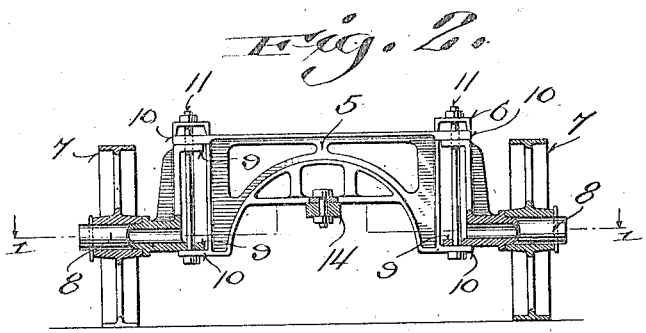
Fig. 2 is a front elevation of the forward end of the truck, this view being taken as indicated on the line 2—2 of Fig. 1.

Referring now more particularly to the accompanying drawings, wherein the invention is embodied in conjunction with a truck structure, 5 designates the front sill of the truck body and 6 designates the side sills thereof which are shown in end elevation in Fig. 2. The front wheels 7 of the truck are carried on stub axles 8 which project from steering knuckles which include each a pair of vertically spaced ears 9 and through each pair of ears 9 and through ears 10 of the front sill member is passed a pivot shaft 11, which shaft is also extended through the side sills 6 of the truck to form a securing means therefor. The front sill 5 to provide for its vertical pairs of ears, 10 is in the form of a skeleton plate of considerable width whereby the ears 9 of the steering knuckles comprise relatively spaced bearings imparting a maximum strength.

For turning the steering knuckles, arms 12 extend forwardly therefrom and these arms are pivotally connected by a link 13. The tongue of the vehicle comprises an inner section 14 which is pivoted to the front sill plate and to the link 14, and an outer section 15 forming the tongue proper, which is pivoted at 16 to the inner section immediately forwardly of the link 13.

The arms 12 are inclined inwardly whereby their pivotal connections with the link 13 lie each in a plane disposed at right angles to the plane of the tongue and steering knuckle pivots, and intersecting said plane at the axis of the respective steering knuckle pivot when the tongue is axially alined with the vehicle whereby substantially a parallelogram is formed permitting free relative pivotal movements without occasioning any slidable pivots.

The foregoing structure is exceedingly simple in design, and it is noted that the entire draft strain is imparted directly to the truck body and not distributed in any manner through the steering knuckle pivots. Also, by pivoting the main tongue body forwardly of the link 13, the major portion of the weight of the tongue is removed from said pivots.

Although the structure has been shown and described particularly as for use in connection with trucks, it is readily understood that it may equally well be applied to any other type of draft impelled vehicles.

I claim:

A one piece skeleton truck sill comprising a flat top strut having ears at the ends thereof, an arched strut disposed beneath the top strut and terminating with an ear at each end thereof in axial alinement with the ears of the top strut, an intermediate transverse tie strut extending across the arch of said arched strut, vertical pillow struts connecting the adjacent ends of said arched strut and top strut, and a steering knuckle pivoted between each pair of axially alined ears.

In testimony that I claim the foregoing I have hereunto set my hand at Port Washington, in the county of Ozaukee and State of Wisconsin, in the presence of two witnesses.

OLAF ELTON.

Witnesses:
    EDW. P. HANS,
    T. A. BOERNER.